(12) United States Patent
Pouli et al.

(10) Patent No.: US 11,238,572 B2
(45) Date of Patent: Feb. 1, 2022

(54) DEVICE AND METHOD FOR DYNAMIC RANGE EXPANSION IN A VIRTUAL REALITY SCENE

(71) Applicant: InterDigital VC Holdings, Inc., Wilmington, DE (US)

(72) Inventors: Tania Pouli, Le Rheu (FR); Jonathan Kervec, Cesson-Sevigne (FR); Hassane Guermoud, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/650,271

(22) PCT Filed: Sep. 26, 2018

(86) PCT No.: PCT/US2018/052861
§ 371 (c)(1),
(2) Date: Mar. 24, 2020

(87) PCT Pub. No.: WO2019/067546
PCT Pub. Date: Apr. 4, 2019

(65) Prior Publication Data
US 2020/0242742 A1 Jul. 30, 2020

(30) Foreign Application Priority Data

Sep. 27, 2017 (EP) .................... 17306281

(51) Int. Cl.
*G06T 5/00* (2006.01)
*H04N 13/117* (2018.01)

(52) U.S. Cl.
CPC .......... *G06T 5/009* (2013.01); *H04N 13/117* (2018.05); *G06T 2207/20208* (2013.01)

(58) Field of Classification Search
None
See application file for complete search history.

(56) References Cited

U.S. PATENT DOCUMENTS 8,610,738 B2 12/2013 Choe et al.
2015/0373247 A1 12/2015 Boitard et al.
(Continued)

FOREIGN PATENT DOCUMENTS

EP 3136737 A1 3/2017
EP 3203439 A2 8/2017
(Continued)

OTHER PUBLICATIONS

Anjyo et al., "Scattered Data Interpolation for Computer Graphics", ACM SIGGRAPH 2014 Courses, Article No. 27, Jul. 2014, pp. 1-69.
(Continued)

*Primary Examiner* — Steven Z Elbinger
(74) *Attorney, Agent, or Firm* — Condo Roccia Koptiw LLP

(57) ABSTRACT

A lower dynamic range visual content (21) of a virtual reality or VR scene represented in a curved shape form is adapted to a higher dynamic range display of the virtual reality scene. At least two views planar key views (230) of the VR scene area obtained, at least two parameter values (240) respectively associated with those planar key views are obtained, corresponding to at least one parameter adapted to expand a dynamic range of a visual content, and a higher dynamic range visual content (22) corresponding to the lower dynamic range visual content in at least part of the VR scene extending beyond the planar key views is determined, based on the parameter values. Applications to Inverse Tone Mapping.

20 Claims, 10 Drawing Sheets

(56) References Cited

U.S. PATENT DOCUMENTS

| | | | |
|---|---|---|---|
| 2017/0018217 A1 | 1/2017 | Ogino et al. | |
| 2018/0308269 A1* | 10/2018 | Baran | H04N 9/77 |
| 2019/0287494 A1* | 9/2019 | Yokota | G06T 5/009 |

FOREIGN PATENT DOCUMENTS

| | | |
|---|---|---|
| WO | WO 2015096955 A1 | 7/2015 |
| WO | WO 2017032822 A1 | 3/2017 |
| WO | WO 2017036908 A1 | 3/2017 |
| WO | WO 2017116952 A1 | 7/2017 |

OTHER PUBLICATIONS

Seitz et al., "View Morphing", 23 Annual Conference on Computer Graphics and Interactive Techniques (SIGGRAPH 1996), New Orleans, Loiusiana, USA, Aug. 4, 1996, pp. 21-30.

Ma et al., "Synthesising Radiance Maps from Legacy Outdoor Photographs for Real-time IBL on HMDs", 2015 International Conference on Image and Vision Computing New Zealand (IVCNZ), Auckland, New Zealand, Nov. 23, 2015, 6 pages.

Banterle et al., "Expanding Low Dynamic Range Videos for High Dynamic Range Applications", 24th Spring Conference on Computer Graphics (SCSG 2008), Budmerice, Slovakia, Apr. 21, 2008, pp. 33-42.

Podborski et al., "Virtual Reality and Dash", IBC Conferencem 2017, Dar es Salaam, Tanzania, Sep. 24, 2017, 11 pages.

Szeliski, R., "Computer Vision: Algorithms and Applications", Springer, Sep. 3, 2010, pp. 1-957.

Iorns, T., "Real-Time Image Based Lighting for 360 Degree Panoramic Video", Masters Thesis in Computer Science, Victoria University of Wellington, New Zealand, 2016, 104 pages.

Nasreen et al., "Key Frame Extraction from Videos—A Survey", International Journal of Computer Science & Communications Networks, vol. 3, No. 3, Jul. 2013, pp. 194-198.

Choi et al., "Text of ISO/IEC DIS 23090-2 Omnidirectional Media Format", International Organization for Standardization ISO/IEC JTC1/SC20/WG11, Coding of Moving Pictures and Audio, Document ISO/IEC JTC1/SC29/WG11 N16824, Hobart, Australia, Apr. 2017, 63 pages.

\* cited by examiner

DEVICE AND METHOD FOR DYNAMIC RANGE EXPANSION IN A VIRTUAL REALITY SCENE

This application claims the benefit, under 35 U.S.C. § 365, of International Application PCT/US2018/052861, filed Sep. 26, 2018, which was published Apr. 4, 2019 in accordance with PCT Article 21(2), in English, and which claims the benefit of European Patent Application No. 17306281.1, filed Sep. 27, 2017.

1. TECHNICAL FIELD

The disclosure relates to the domain of Virtual Reality (VR) and regards more particularly dynamic range expansion applied to curved shape representations.

It is particularly relevant to Inverse Tone Mapping (ITM).

2. BACKGROUND ART

Currently, two key technologies in the context of media and entertainment are High Dynamic Range (HDR) imaging and Virtual Reality (VR), HDR refers to content and displays that encode a wider range of luminance and contrast relative to traditional solutions, and are therefore capable of better representing illumination in real scenes, VR, on the other hand, refers to technologies that simulate a real, complete field of view, allowing the viewers to experience a scene as if they were present in it. In contrast to viewing images on a traditional display, VR devices lead to increased immersion and realism.

More precisely in VR, content often takes the form of 360° scenes, in which the viewer can look (or even move) freely around. Such scenes can usually be thought of as cylinders (360° horizontally) or spheres (360° horizontally and vertically), with the viewer placed at a central point.

Both technologies have been gaining significant momentum in the consumer market in recent years: HDR has been adopted as an enhancement for current television and cinema oriented entertainment, while VR has been demonstrated mostly in the context of gaming. Given the attractiveness of those technical developments, it is likely that in the near future, displays integrated in VR devices will become HDR, necessitating appropriate tools for content preparation. Specifically, considering HDR displays in VR devices, tone management solutions will be necessary for simultaneously controlling and improving the visual quality of images as well as for ensuring visual comfort and safety.

A particular important aspect of HDR VR devices relates to the case of legacy, non-HDR VR content being shown on an HDR VR device. In traditional displays, to show non-HDR content on an HDR display, algorithms commonly known as Inverse Tone Mapping (ITM) are employed, which aim to expand and reshape the dynamic range of the content so that the latter is better suited to an HDR display. For videos, such solutions need to handle temporal aspects so that processing is temporally stable. Also, the implementations may rely on analyzing the content in order to adapt parameters of the dynamic range expansion.

WO 2017/116952 discloses viewport independent image coding and rendering in which a device receives a spherical image of a spatial environment that contains spherically arranged pixel values indexed by a time value and is represented in a content creation coordinate system in reference to a spatial position, indexed by the time value, in the spatial environment. A spatial relationship is determined between the content creation coordinate system and a spherical image reference coordinate system and spherical distributions of image metadata are determined for the spherical image based at least in part on the spatial relationship and the spherically arranged pixel values.

In "Expanding Low Dynamic Videos for High Dynamic Range Applications," Francesco Banterle et al. expands the contrast range of Low Dynamic Range (LDR) videos to regenerate High Dynamic Range (HDR) data through the use of inverse tone mapping.

In "View Morphing," S. M. Seitz et al, describe an extension to image morphing techniques using basic principles of projective geometry.

Regarding HDR VR devices, however, several more challenges arise, specific to the VR format. If ITM methods relevant to traditional images or videos are applied as such, they prove far from optimal, since the entire VR scene is treated as an image to be viewed globally.

Particular issues are then due to the fact that such a global approach is usually not adapted to local variations, possibly critical to specific viewpoints.

Considering the application of local processing in various portions of the VR scene, other issues arise, due to the need of coherence over the scene, notably in case a user looks around the scene. Also, processing costs may become prohibitive, a large amount of processing power being generally needed.

3. SUMMARY

A purpose of the present disclosure is to enable an ITM solution appropriate for VR, and more generally to a solution for range expansion adapted to VR.

In advantageous implementations, the disclosure proposes solutions enabling to obtain ITM results adapted specifically to the content of each viewpoint of a VR scene, coherent as a user looks around the scene and/or providing a consistent look during successive views when the VR scene is dynamic over time.

Other potential advantageous aspects of the disclosed solutions are cost-efficient implementations, making possible real-time execution even possibly with limited resources.

It can further possibly be taken advantage of existing ITM tools dedicated to traditional video images.

In this respect, an object of the present disclosure is notably a device for adapting a lower dynamic range visual content of a virtual reality scene represented in a curved shape form, to a higher dynamic range display of the virtual reality scene.

According to the disclosure, the device comprises at least one processor configured for obtaining at least two planar key views of the virtual reality scene, obtaining at least two parameter values respectively associated with the planar key views, those parameter values corresponding to at least one parameter adapted to expand a dynamic range of a visual content, and determining a higher dynamic range visual content corresponding to the lower dynamic range visual content in at least part of the virtual reality scene extending beyond the planar key views, called a range expansion area, based on the parameter values.

A "planar key view" refers to a planar view of a portion of the VR scene, i.e. a planar image extracted from the VR scene by a planar projection of a portion of the VR scene represented in its curved shape form. It is advantageously created by projecting points of the surface of that curved shape form representation from a center of projection towards a plane tangential to the curved shape form representation.

When the VR scene has a spherical representation, the planar image is advantageously created by projecting points of the surface of the related sphere from the sphere center towards a plane tangential to that sphere. A gnomonic projection can notably be used in this respect.

Though a planar key view does not belong to the VR scene representation, it is sometimes referred to below as being "part" of the VR scene for sake of conciseness.

The planar key views are advantageously depicting important or representative parts of the VR scene.

In particular implementations, the virtual reality scene is spherical or cylindrical.

The "lower" and "higher" dynamic ranges are relative to one the other, the passage from a content having a lower dynamic range to a content having a higher dynamic range amounting to a dynamic range expansion.

Advantageously, the device is configured for Inverse Tone Mapping (ITM), the dynamic range regarding a luminance of the visual content.

In variants, the dynamic range pertains to another entity, which may pertain e.g. to a chrominance or a depth field.

The device can potentially offer a great flexibility for varying dynamic range expansion over the VR scene, depending on the considered location in the scene. In fact, each viewpoint of a VR scene can possibly be processed separately regarding the range expansion, in function of its content. In addition, in advantageous implementations, a user can view coherent results over the VR scene as obtained by exploiting the planar key views.

Among other potential advantages, the device can allow for more optimal and precise artistic control than would be feasible by applying a traditional range expansion solution to a projected VR image.

In addition, the present device can offer an attractive alternative to directly interpolating user parameters from their values in the planar key views. Indeed, different parameters are likely to interact in complex ways, so that intermediate values for all parameters between two key views do not necessarily lead to a satisfying intermediate visual result.

The device advantageously comprises at least one input adapted to receive the VR scene (i.e. corresponding data) and at least one output adapted to output the higher dynamic range visual content in the range expansion area.

In particular implementations, at least one of the parameter values associated with at least one of the planar key views depends on the lower dynamic range visual content in the latter planar key view(s).

Advantageously, those parameter values are automatically determined based on automatic analysis of that lower dynamic range visual content. Alternatively or in combination, a user determines, selects, or participates in obtaining, those parameter values.

In both cases (automatic and at least partially user controlled determination), exploiting the planar key views advantageously permits the application of known range expansion approaches, in determining the parameter values. In particular, the device makes advantageously possible to select parts of the scene that can be viewed or edited on a planar screen with much less distortion than with global planar projections. In this way, the images at the planar key views can have a well-controlled appearance, and exploited on a safe ground in other portions of the VR scene.

In this respect, at least one of the planar key views has advantageously a size based on a field of view of a human visual system and/or at least one field of view of one or more display device, such as notably a target virtual reality device and/or a color grading monitor. That size corresponds advantageously to a minimum of at least two of those fields of view.

The size can correspond notably to a horizontal and/or vertical dimension, and can be e.g. expressed as an angle of aperture.

The parameter values associated with the key views and depending on the visual content can be predefined and/or provided for each key view, which can be relevant to known contents (e.g. films). They can alternatively be determined on the fly through content analysis, in which ease the whole process can possibly be adaptive, thereby suitable notably for live broadcasting (e.g. sports programs).

In variants, the parameter values associated with the planar key views depend on the positioning of the planar key views in the VR scene, independently of the lower dynamic range visual content in those planar key views.

For example, an enhanced highlighting effect can be obtained at central parts of the scene and become negligible close to edges. In another example, an enhanced highlighting effect can be obtained in the neighborhood of an identified object and decrease or disappear at a given distance of that object—which enhanced highlighting effect can possibly be dynamic if the object is moving.

Other applications of the parameter values depending on the positioning of the planar key views and not on the corresponding visual content, can be exploited in the field of video games. Related environments being known in advance (e.g. indoor areas, specific outdoor levels), the dimensions and positioning of the planar key views in a 3D world inside a game, and the associated parameter values, are predefined for each of those environments. In this way, the same planar key views and associated parameter values can be loaded for example whenever a player returns to a same room.

The two above solutions of the parameter values either depending on the visual content or not depending on the visual content can be combined, one solution or the other being adopted in function of the planar key views.

In advantageous modes, determining the higher dynamic range visual content in the range expansion area includes determining a range expansion representation in the range expansion area by combining at least two elementary range expansion representations in the range expansion area, those elementary range expansion representations being associated with the respective planar key views and being based on the parameter(s), and determining the higher dynamic range visual content in the range expansion area from that range expansion representation.

Arriving at the higher dynamic range visual content in the range expansion area through the intermediary of the range expansion representation can be cost effective, since avoiding the more demanding determination of full higher dynamic range visual contents resulting from the parameter values of the associated planar key views and proceeding with operations on those full higher dynamic range visual contents.

Preferably, obtaining and combining the elementary range expansion representations in the range expansion area requires substantially less operations than would be necessary for determining and combining elementary lower dynamic range visual contents in the range expansion area (i.e. associated with the respective planar key views and being based on the parameter(s)).

In particular modes, combining the elementary range expansion representations includes weighting the elementary range expansion representations with respective weights decreasing with distances from at least part of the range expansion area to the associated planar key views.

Those distances are advantageously measured between centers of the planar key view and of the part(s) of the range expansion area. Notably, in case the latter corresponds to a user view, the distances are considered with respect to a center of the user view; while in case the latter corresponds to a current pixel, the distances are considered with respect to that pixel.

Also, those distance are advantageously geodesic distances on the curved shape form of the VR scene. In particular related execution modes, the curved shape form is spherical and the geodesic distance is an orthodromic distance.

Such a weighting enables to favor the proximity of the considered planar key views in obtaining the range expansion representation.

Also, in particular implementations, determining the higher dynamic range visual content includes powering a luminance of the lower dynamic range visual content with the range expansion representation (i.e. raising the luminance at a power given by the range expansion representation).

In a first category of execution modes, the range expansion area is located within at least one current view available to a user in the virtual reality scene.

This can reduce significantly the computational efforts, and is thus more particularly adapted to operations on the fly or online applications. Such solutions take advantage of the fact that contrary to traditional images, in which the whole image can be perceived globally, the whole VR scene is not viewed at the same time.

In a second category of execution modes, a union of the planar key views and of the range expansion area covers entirely the virtual reality scene.

This proves convenient in particular for preprocessing or offline applications.

In particular embodiments, the range expansion area comprises at least part of the planar key views.

Namely, one or more of the planar key views are then themselves submitted (fully or partly) to dynamic range expansion, relying on their own parameter values and possibly also on parameter values associated with others of the planar key views. In this way, a smoother illumination rendering can be obtained.

In alternative modes, only parts of the VR scene complementary to the planar key views are submitted to dynamic range expansion.

In advantageous modes, the processor(s) is/are further configured for selecting as the planar key views among a set of potential planar key views, at least two of the potential planar key views being closest to at least a portion of the range expansion area.

For example, in a cylindrical or spherical VR scene, only the two closest planar key views on the right and on the left of the range expansion area are kept. In another example for a spherical VR scene, the four closest planar key views are kept, respectively on the right and on the left, above and below the concerned portion.

Those distances are advantageously measured between centers of the planar key view and of the portion(s) of the range expansion area. Notably, in case the latter corresponds to a user view, the distances are considered with respect to a center of the user view; while in case the latter corresponds to a current pixel, the distances are considered with respect to that pixel.

h associated embodiments, the range expansion area comprising pixels, the portion(s) correspond(s) to any of those pixels.

Also, those distance are advantageously geodesic distances on the curved shape form of the VR scene. In particular related execution modes, the curved shape form is spherical and the geodesic distance is an orthodromic distance.

In particular implementations in which the virtual reality scene is temporally varying as a video content, the processor(s) Is/are further configured for extracting at least two shots from the video content, extracting one single representative frame from each of those shots, and in each of those representative frames, obtaining the planar key views and the associated parameter values, and determining the higher dynamic range visual content from the planar key views and associated parameter values, in other frames than those representative frames in any of those shots, determining the higher dynamic range visual content based on positions of the planar key views and on the associated parameter values as obtained for the representative frame of that shot.

In some modes, the parameter(s) is/are selected among parameters controlling a range expansion in a lower luminance zone, a range expansion in a higher luminance zone, a range expansion in a middle luminance zone, and parameters defining thresholds between luminance zones.

In particular implementations regarding key view extraction, the processor(s) is/are configured for any of the below: extracting the planar key views based on a regular sampling of the virtual reality scene; obtaining a subset of selected planar key views from a higher number of original planar key views, by extracting the planar key views from at least two feature clusters associated with the original planar key views (e.g. by extracting one of the planar key views from each of the feature clusters); extracting the planar key views based on at least one level of local information chosen among at least one of local contrast, color information such as e.g. saturation, and saliency; extracting the planar key views based on sound changes (the VR scene being associated with audio signals) and/or movement intensities (the virtual reality scene being subject to movements); and/or extracting the planar key views based on a concentration of samples associated with brightness levels in the VR scene (a particularly interesting solution here).

Advantageously, the VR scene being projection coded as a planar surface, the planar key views are extracted from that planar surface. In a specific implementation thereof, the curved shape form is a sphere and the planar surface is selected among an eguirectangular projection and a cube map.

The disclosure also relates to a mobile apparatus such as a head-mounted display (HMD), a smartphone, a tablet or a game console, including a device according to any of the above embodiments. It further concerns a network node apparatus, such as a gateway, including such a device.

Another object of the disclosure is a method for adapting a lower dynamic range visual content of a virtual reality scene represented in a curved shape form, to a higher dynamic range display of the virtual reality scene.

According to the disclosure, the method comprises: obtaining at least two planar key views of the virtual reality scene, obtaining at least two parameter values respectively associated with the planar key views, those parameter values corresponding to at least one parameter adapted to expand a dynamic range of a visual content, determining a higher dynamic range visual content corresponding to the lower dynamic range visual content in at least part of the virtual reality scene extending beyond the planar key views, called a range expansion area, based on the parameter values.

That method is advantageously executed by a device according to any of the disclosure modes.

In addition, the disclosure relates to a computer program comprising software code adapted to perform a method compliant with any of the above execution modes when the program is executed by a processor.

The present disclosure further pertains to a non-transitory program storage device, readable by a computer, tangibly embodying a program of instructions executable by the computer to perform a method for editing a virtual reality scene, compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM (read-only memory), an EPROM (Erasable Programmable ROM) or a Rash memory, a portable CD-ROM (Compact-Disc ROM).

4. LIST OF FIGURES

The present disclosure will be better understood, and other specific features and advantages will emerge upon reading the following description of particular and non-restrictive illustrative embodiments, the description making reference to the annexed drawings wherein.

Figure 1:
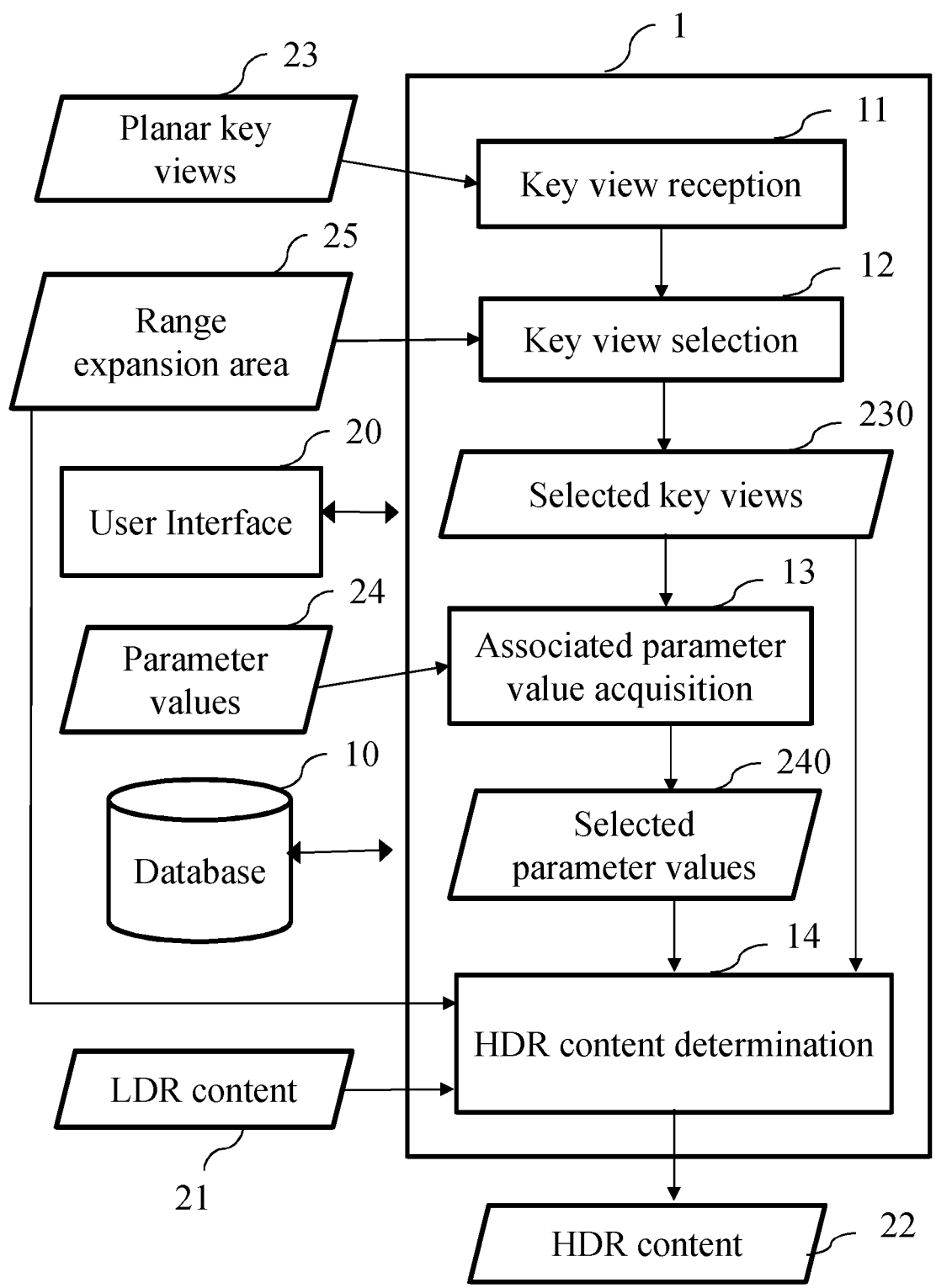
FIG. 1 is a block diagram representing schematically a device for adapting a lower dynamic range content, compliant with the present disclosure.
Figure 13:
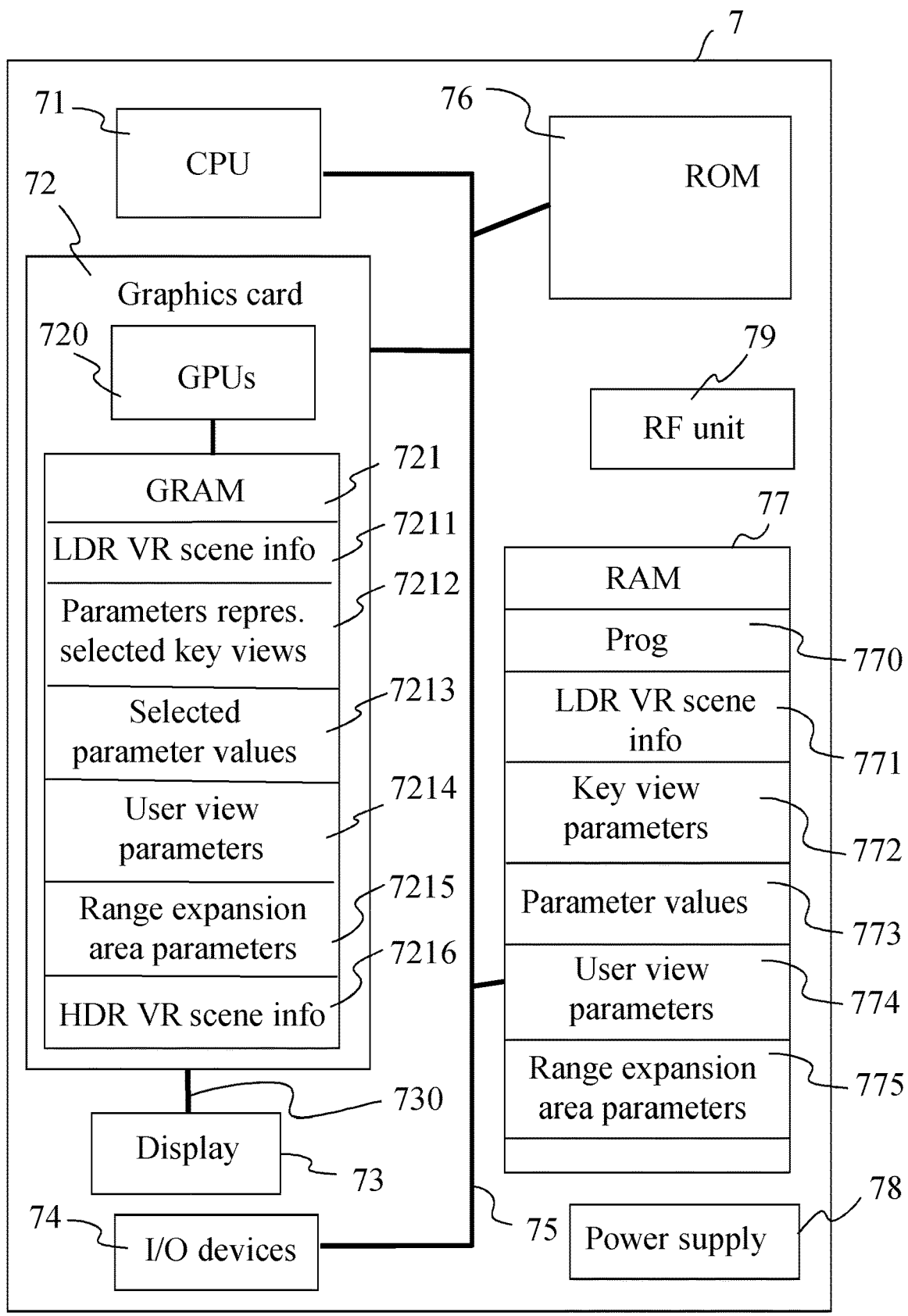

FIG. 13 diagrammatically shows a VR apparatus comprising the device represented on FIG. 1.

5. DESCRIPTION OF EMBODIMENTS

The present description illustrates the principles of the present disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The terms "adapted" and "configured" are used in the present disclosure as broadly encompassing initial configuration, later adaptation or complementation of the present device, or any combination thereof alike, whether effected through material or software means (including firmware).

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared. Moreover, explicit use of the term "processor" should not be construed to refer exclusively to hardware capable of executing software, and refers in a general way to a processing device, which can for example include a computer, a microprocessor, an integrated circuit, or a programmable logic device (PLD). Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM memory. Instructions may be notably stored in hardware, software, firmware or in any combination thereof.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present disclosure will be described in reference to a particular functional embodiment of a device 1 for adapting a lower dynamic range visual content to a higher dynamic range display, as illustrated on FIG. 1.

The device 1 is adapted to transform a low dynamic range (hereinafter LDR) content 21 of a VR scene having a curved shape form, such as a 360° sphere or cylinder, to a high dynamic range (hereinafter HDR) content 22. In this respect, the device 1 is configured for exploiting planar key views 23 associated with respective parameter values 24, the latter corresponding to one or more parameters adapted to expand a dynamic range of a visual content. The range expansion is applied in a range expansion area 25 located at least partly beyond the planar key views 23, but possibly also covering part or whole of the planar key views 23.

In advantageous embodiments detailed below, the dynamic range expansion pertains to a luminance of the contents, and amounts to an ITM processing.

In particular implementations, the parameter values 24 associated with the planar key views 23 are based on values of the relevant parameter(s) at centers of those planar key views 23. Such a parameter value 24 can for example be given by averaging values of the related parameter over the concerned planar key view 23, or by threshold or adjustment values provided over the whole concerned planar key view 23—e.g. by considering luminance properties over the planar key view 23.

The device 1 is advantageously an apparatus, or a physical part of an apparatus, designed, configured end/or adapted for performing the mentioned functions and produce the mentioned effects or results. In alternative implementations, the device 1 is embodied as a set of apparatus or physical parts of apparatus, whether grouped in a same machine or in different, possibly remote, machines.

In what follows, the modules and sub-modules are to be understood as functional entities rather than material, physically distinct, components. They can consequently be embodied either as grouped together in a same tangible and concrete component, or distributed into several such components. Also, each of those modules is possibly itself shared between at least two physical components. In addition, the modules are implemented in hardware, software, firmware, or any mixed form thereof as well. They are preferably embodied within at least one processor of the device 1.

The device 1 comprises a module 11 for receiving the planar key views 23, a module 12 for determining, from the received planar key views 23 and from the concerned range expansion area 25, selected planar key views 230 among the available planar key views 23 and a module 13 for obtaining selected parameter values 240 associated with the selected planar key views 230, among the parameter values 24.

The planar key views 23 can be given by complete data defining them. In alternative implementations, they include only partial data on those key views, sufficient for particular range expansion. For example, those data are defining centers of the planar key views 23 while the associated parameter values 24 are modeled as applied at the key view centers.

The parameter values 24 associated with the planar key views 23 are preferably determined automatically, according to predetermined criteria. Extracted key views can then be directly transmitted to an automatic range expansion system. In this respect, existing methods for automatic image enhancements can be directly applied to those extracted key views, relying on parameters depending on the image content.

The parameter values 24 can then be retrieved from that range expansion system in association with the planar key views 23.

The parameter values 24 can alternatively be obtained by manual processing, being e.g. determined by artists on the ground of the planar key views 23, which can be viewed without projection distortions on a normal display. The latter solution is particularly attractive for special dynamic range arrangements (e.g. providing higher dynamic range effects in some given VR scene areas). It can be combined with the previous automatic determination, as a potential option offered to a user or an operator.

Quite interestingly, the planar key views subject to range expansion can be treated as equivalent to frames of a video, and worked on in a similar way.

The selection among the candidate planar key views 23 is advantageously based on distances between them and processed portions of the range expansion area 25, the selected planar key views 230 being closest to those processed portions. In some modes, the latter coincide with the range expansion area 25 as a whole. Namely, the distance is determined between one of the planar key views 23 and the range expansion area 25, which can notably consist in a user view. In other modes, the distance is determined between one of the planar key views 23 and a continuous portion of the range expansion area 25, which can notably consist in one user view among at least two user views constituting the range expansion area 25. In alternative embodiments, the processed portions of the range expansion area 25 correspond to pixels, so that the distance is determined between one of the planar key views 23 and one of those pixels—in such embodiments, the range expansion area 25 can possibly cover the whole VR scene.

The terms "user views" refer to current views available to one or more users at a given time. More precisely, each of the user views advantageously corresponds to a portion of the VR scene as viewed by an observer at a given point in time, such as notably with a VR headset or a viewer. It depends notably on the respective positions of the observer and viewing apparatus. Such a user view is close to what would be traditionally visible on a display. In alternative or complementary implementations, one or more views subject to range expansion corresponding to a screen of a visualization or processing apparatus are considered. For sake of convenience, the terms "user views" are considered below as encompassing also such planar views.

Considering two or more user views can notably enable to anticipate user eyes movements and/or to have two or more users sharing a same 360° immersive scene, whether through a joint presence in a common surrounding environment or by being connected to a same control device.

Also, for VR video, different portions of the VR scene may be viewable online by the user at distinct times. Then, the preprocessing edition propagation can be restricted for each instant VR scene to the concerned portions—thereby providing significant computational savings.

The various key view selection modes can be combined together in any operational way, which includes the case in which the device 1 is configured for executing any of them depending on an operator setting and/or a user choice.

Specific criteria in the selection can include the number and positioning of the selected planar key views 230, e.g. two on the right and the left (horizontal direction), or four respectively on the right and on the left (horizontal direction), below and above (vertical direction). In case none of the planar key views 23 is available in the target direction, e.g. if an upper edge of a cylindrical VR scene is reached by the range expansion area 25, the number of the selected planar key views 23 is reduced accordingly, which may e.g. lead to three selected planar key views 230 instead of four.

In variants, more of the planar key views 23 are selected. For example, the closest ones are kept (whenever possible) within a predetermined reach around the range expansion area 25 or around the currently processed portion(s) thereof. In other variants, the four closest planar key views 23 diagonally located with respect to the currently processed portions are encompassed (whenever possible), further to the four ones in the horizontal and vertical directions.

The distance between one of the planar key views 23 and a considered portion of the range expansion area 25 is advantageously determined between respective centers of that planar key view 23 and of that portion (which in the case of the portion being a pixel, amounts to the pixel itself).

In variants, the distance is determined between closest points of the planar key view 23 and of the considered portion of the range expansion area 25. In other variants, the distance is determined between a center of the planar key view 23 and a point of the considered portion closest to that center; or between a center of the considered portion and a point of the planar key view 23 closest to that center.

The determination of the selected planar key views 230 can be static, if the range expansion area 25 is fixed as well as the planar key views 23. It can also be dynamic, in particular when the range expansion area 25 is moving, which usually happens if it coincides with one or more user views.

In particular implementations, the range expansion can be applied not only beyond the planar key views 23, but also inside. The processing carried out within the concerned planar key views 23 is then similar to the one carried out outside, for example if a portion of one of the planar key views 23 is subject to the range expansion together with a contiguous portion of the range expansion area 25 beyond the planar key views 23.

The device 1 also comprises a module 14 for determining the HDR content 22 in the range expansion area 25 from the LDR content 21, based on the selected planar key views 230 and their associated parameter values 240.

Figure 2:
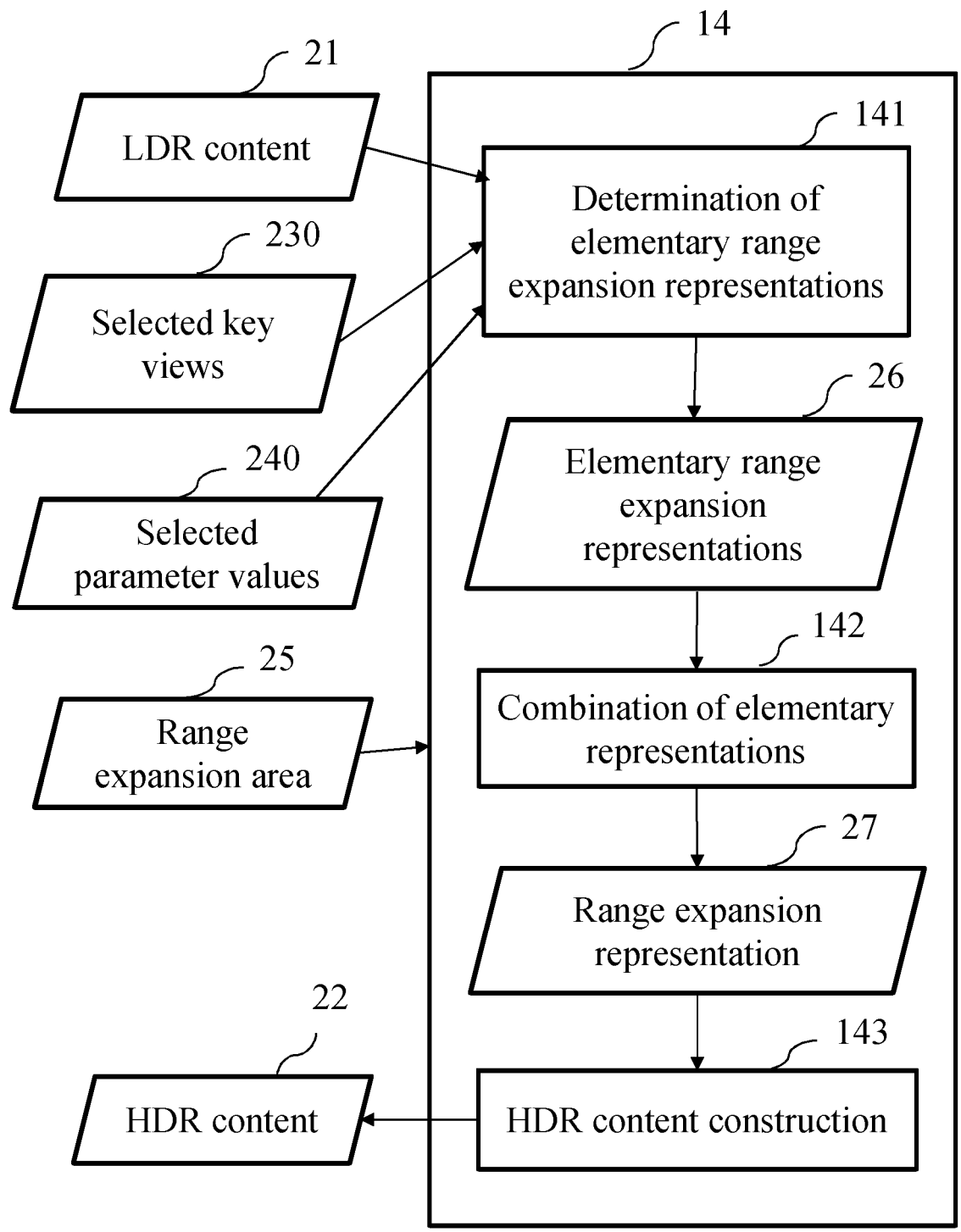
FIG. 2 is a block diagram detailing a module for higher dynamic range content determination of the device of FIG. 1.

More precisely in advantageous implementations, as represented on FIG. 2, the module 14 comprises a sub-module 141 for determining elementary range expansion representations 26 over the range expansion area 25, respectively based on the parameter values 240 of the selected planar key views 230. It further comprises a sub-module 142 for combining those elementary range expansion representations 26 into a resulting range expansion representation 27, such as e.g. by weighting the elementary range expansion representations 26 in function of distances between the range expansion area 25 and the respective selected planar key views 230.

Such a distance can correspond notably to a distance between a center of a currently processed portion of the range expansion area 25 and a center of the considered selected planar key view 230. In variants, they are determined between a center of the processed portion and a point of the considered planar key view 230 closest to that center; or between a center of the considered planar key view 230 and a point of the processed portion closest to that center.

In addition, the module 14 includes a sub-module 143 for constructing the HDR content 22 over the range expansion area 25, from the range expansion representation 27.

Constructing indirectly the HDR content 22 from the range expansion representation 27 can reduce significantly the required computation resources in some advantageous embodiments. This can be interesting notably when demanding operations rely on exploiting an intermediary field for building the HDR content. Identifying that intermediary field to the range expansion representation, the demanding operations are executed only once if the intermediary field is resulting from taking the selected planar key views 230 into account and is thus directly used for building the HDR content 22. By contrast, if elementary HDR contents are constructed for respective elementary intermediary fields corresponding to the selected planar key views 230, before being combined into the resulting HDR content 22, the demanding operations are multiplied by the number of the selected planar key views 230.

In variants (not represented), instead of determining the elementary range expansion representations 26 and of combining them into the resulting range expansion representation 27, so that it be exploited in constructing the HDR content 22, the range expansion is directly effected on the LDR content 21. This includes determining elementary HDR contents and combining them into the resulting HDR content 22.

The required data, parameters and values are advantageously retrieved and/or stored from/into one or more local or remote database(s) 10. The latter can take the form of storage resources available from any kind of appropriate storage means, which can be notably a RAM or an EEPROM (Electrically-Erasable Programmable Read-Only Memory) such as a Flash memory, possibly within an SSD (Solid-State Disk).

Alternatively, at least part of those data, parameters and values are received from a communication network or directly user entered or user selected.

In first modes, the whole VR scene is affected by the range expansion, which enables to get a global HDR representation. In particular implementations, the range expansion is then carried out offline by the device 1, during a pre-processing stage. In this way, the HDR VR scene is later available for any user's view during online operations.

This can be suited to a static scene, in which no movements of objects within the VR scene are considered. This can also be relevant to a dynamic scene, the device 1 applying advantageously the range expansion to a set of special key frames obtained from an animated sequence or shot, before exploiting that set in the whole VR scene.

In second modes, the range expansion regards only part of the VR scene. This can be useful in particular in case the extent of the VR scene viewable online is restricted. Namely, the range expansion area 25 then corresponds to one or more current user views, on which the range expansion processing is focused.

Those second modes are particularly suited to online exploitation of consumer products. They can allow a substantial reduction of computation costs for editing the user views, based on appropriate planar key views 23 having their associated parameter values 24.

The device 1 is interacting with a user interface 20, via which information can be entered and retrieved by a user. The user interface 20 includes any means appropriate for entering or retrieving data, information or instructions, notably visual, tactile and/or audio capacities that can encompass any or several of the following means as well known by a person skilled in the art: a screen, a keyboard, a trackball, a touchpad, a touchscreen, a loudspeaker, a voice recognition system.

For example, the user interface 20 enables a user to enter a number of extracted planar key views dedicated to range expansion, to select or enter some of the parameter values and/or to select a desired output (whole VR scene, user view . . . ) from the device 1.

The number of the extracted key views exploited for range expansion is e.g. comprised between 1 and 20, and preferably between 1 and 10. Setting that number to 1 can amount to a global range expansion corresponding to a traditional method. Also, increasing the number of key views can enhance the range expansion capacities, subject to additional computation costs.

5.1—Extraction of the Planar Key Views and User Views

More details are provided below about the extraction of the planar key views 23 available for range expansion, as well as of the user views. Advantageously, several points are first selected and serve as respective centers of key views to be extracted. Depending on the embodiments, those points are selected either by regularly sampling the VR scene, or by analyzing the complete VR scene and selecting areas that conform to particular characteristics.

The VR scene analysis and the criteria for key view extraction can be chosen in function of targeted applications. In particular, for a dynamic VR scene, temporal information can play an active role in extracting the key views to be initially edited, advantageously either in the form of motion or in the form of audio.

Once center points are selected, planar key views can be extracted from the related representation, e.g. from a 380° VR sphere. To determine degrees of visual angle horizontally and vertically covered by those key views, several aspects can be considered, including:

capabilities and a visual field of the human visual system;
a target VR viewing device and a field of view (FoV) covered by its display;
a target color grading monitor and its FoV.

Figure 3:
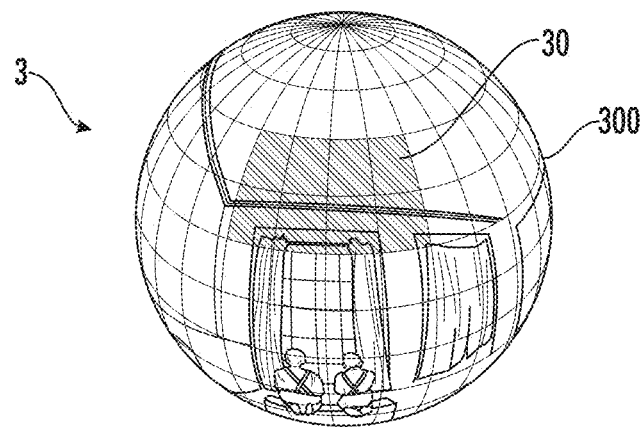
FIG. 3 illustrates the extraction of a single view from a spherical VR scene, as exploited in the device of FIG. 1.
Figure 4:
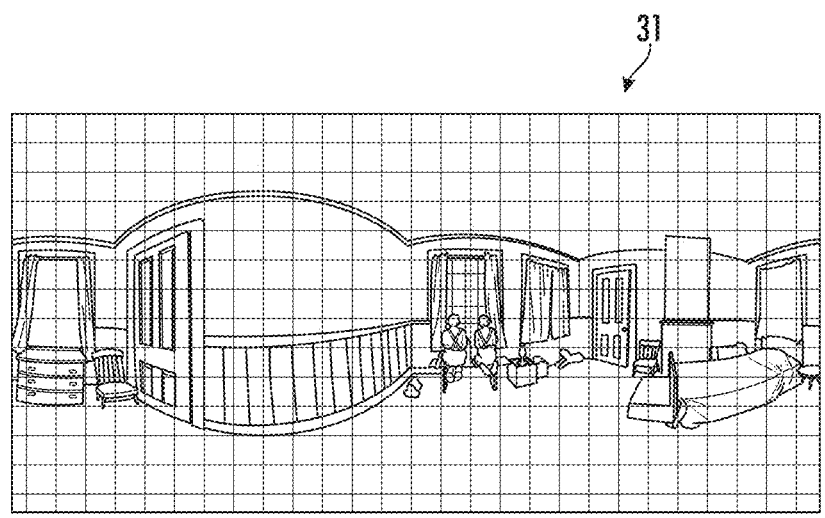
FIG. 4 shows an equirectangular projection of the spherical VR scene of FIG. 3.
Figure 5:
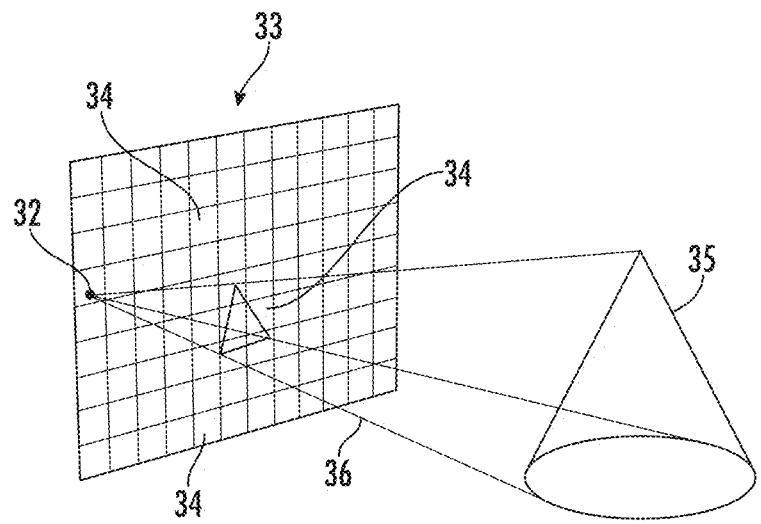
FIG. 5 illustrates a scene to camera plane projection as applied for extracting the single view of FIG. 3 on the ground of the equirectangular projection of FIG. 4.

The process for extracting the planar key view 23 is now detailed in an example, in relation with FIGS. 3 to 5. As represented on FIG. 3, a view 30 corresponding to a planar image needs to be extracted from a spherical VR scene 3 represented on a sphere 300 (for sake of illustration only, the view 30 is magnified with respect to generally exploited key views; it is presently e.g. turned towards a ceiling).

To extract the view 30 from the sphere 300, the following pieces of information can be exploited:

camera position—considered at the center of the sphere 300;
camera viewpoint—corresponding to a center of the view 30 and given as spherical coordinates;
camera field of view—in horizontal and vertical degrees;
camera projection model—describing how a point in the sphere 300 is projected to the camera plane.

In addition, the spherical VR scene 3 is encoded into a planar image format using a map projection. In particular implementations, an equirectangular projection 31 is used, as visible on FIG. 4, the sphere 300 being unwrapped towards a plane. In this projection, the whole spherical scene 3 is visualized within a single planar image that can be viewed on a normal display. It should be noted that different parts of the scene 3 obtain different amounts of deformation: the center part corresponding to the equator of the sphere 300 has less deformation, while the poles obtain more distortion. However, the distortion is horizontal only, since parallel vertical lines remain parallel. Additionally, the horizontal coordinate provides the latitude on the sphere 300.

Extracting the view 30 from the sphere 300 amounts to a standard ray tracing problem, about which more details can be found for example in the article by R. Szeliski, "Computer vision: algorithms and applications", *Springer Science & Business Media*, 2010. In practice, as visible on FIG. 5:

a canvas (plane) 33 formed of a grid of pixels 34 is defined relative to a hypothetical camera focal point (center of projection) 32, representing an image plane to be extracted, with a desired resolution;
for each pixel 34 in this canvas 33, a line 36 is extended from the center of projection 32 through that pixel 34 towards a surface of a 3D object 35, present in the scene 3 represented by the sphere 300; at an intersection point of that line 36 with the surface of the sphere 300 (which coincides with the surface of the 3D object 35), a value is obtained and attributed to that pixel 34;
the same operation is repeated for all pixels 34 in the canvas 33 until the whole image is obtained.

A mapping between the sphere 300 and an individual planar view is thereby obtained. Additional steps are required for getting the mapping between the individual planar view (canvas 33) and the equirectangular projection 31. To obtain planar coordinates (x, y) in that equirectangular projection 31 from spherical coordinates on the sphere, given by the longitude $\lambda$ and latitude $\phi$, the following equations apply:

$$x = (\lambda - \lambda_0) \cos \phi_1 \quad (1)$$

$$y = \phi - \phi_1 \quad (2)$$

where $\lambda_0$ is a central meridian and $\phi_1$ is a standard parallel, which in the case of an equirectangular projection is set to 0°.

The inverse projection, i.e. for obtaining latitude and longitude on the sphere 300 from a given position in the equirectangular projection 31, is given by:

$$\lambda = \frac{x}{\cos \varphi_1} + \lambda_0 \quad (3)$$

$$\phi = y + \phi_1 \quad (4)$$

In order to get the user view(s), which can be extracted from the sphere 300 at each point of time depending on the viewer orientation, it can be proceeded as described above in obtaining the extracted key views to be initially edited.

Various methods can be carried out for extracting the planar key views 23. In one of them, the VR scene is sampled in a regular manner in order to select the key views. More precisely, sampling angular distances $\theta_h$ and $\theta_v$ are determined respectively in the horizontal and vertical directions. In particular modes, those angular distances are derived from the fields of view (FoV) of the human visual system $f_{hsv}$, of the target VR device $f_{VR}$, and of the color grading monitor to be used $f_c$, each expressed in degrees of horizontal and vertical visual angles, by the smallest of those three parameters ($f_{hsv}$, $f_{VR}$, $f_c$). That selection avoids oversampling the VR scene.

Figures 6A, 6B:
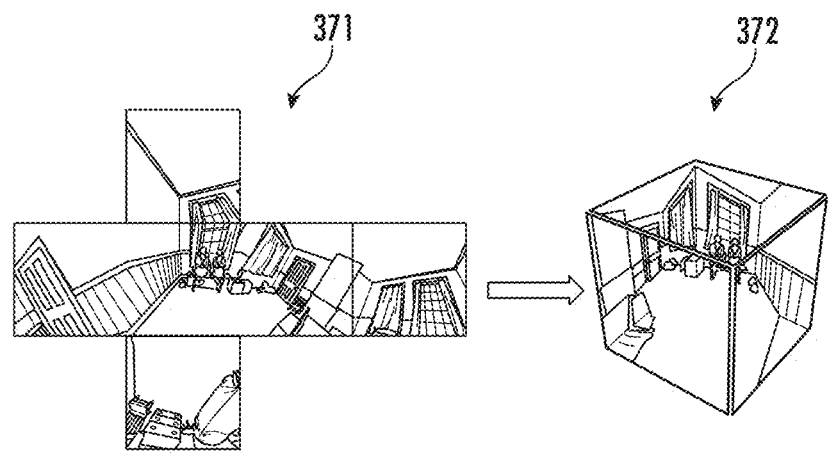
FIGS. 6A and 6B show a cube map projection of the spherical VR scene of FIG. 3 in a respectively unfolded and folded form.

In a variant implementation, the sphere 300 is encoded using a cube map projection 371 (FIG. 6A), as represented in a folded form 372 on FIG. 65. The corresponding processing will not be developed in the present application, as being well known to a person skilled in the art.

Figure 7:
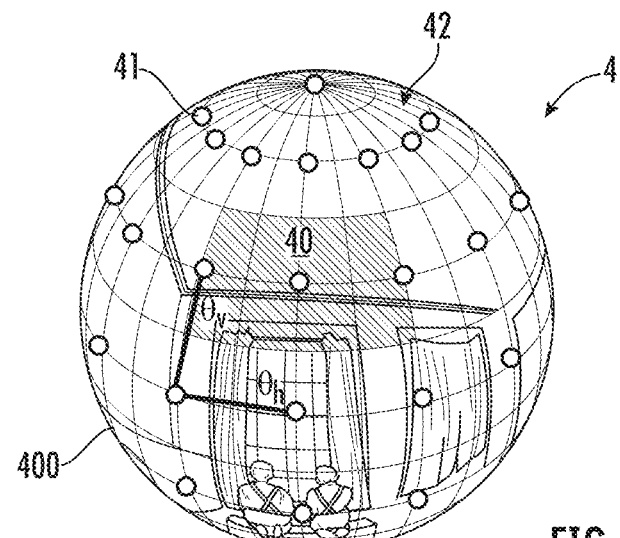
FIG. 7 represents a sampled spherical VR scene according to a particular distribution of planar key views in a VR scene, as exploited in a device as shown on FIG. 1.

As illustrated in an example on FIG. 7, a sphere 400 representing a VR scene 4 is sampled every $\theta_h$ and $\theta_v$ degrees (sampling 42), defining sampling points 41 that constitute the centers 41 of key views 40 to be extracted. Using a desired camera model, which can be specified by the user, and by placing a virtual camera at the center of the sphere 400, the key views 40 can be extracted for each of the sampling points 41.

Other modes of extraction of the planar key views include:
- a selection based on local information, such as an amount of local contrast, color information such as e.g. saturation or saliency, or frequency information; notably, contrast information in a scene plays a key role for guiding viewers' attention towards different parts of the scene, the human visual system perceiving scenes mostly in terms of contrast rather than direct luminance information;
- a selection based on a concentration of samples associated with brightness levels in the virtual reality scene, which can be notably relevant to importance sampling for HDR applications (a larger number of points being generally allotted to brighter parts of the scene);
- a two-step selection relying on first extracting key views by e.g. a regular sampling as described above, calculating visual features for each of those key views, clustering the key views in function of those visual features and selecting a single representative key view for each of at least two resulting feature clusters;
- a selection based on surround sound changes, since it can be expected that even audio cues coming from behind the users are able to attract their attention to previously invisible parts of the scene;
- a selection based on local movement intensities, insofar as the viewer's attention and gaze are likely attracted towards parts of the scene where local motion takes mainly place.

Any alternative determination of the originally edited planar key views can be considered, such as e.g. explicit user extraction. In addition, the key view selection modes can be combined in any appropriate way.

More details about the determination of the planar key views are provided in the co-pending European patent application at the name of the present Applicant, filed on 7 Jun. 2017 under filing number 17305675.5 (inventors: F. Pouli, J. Kervec, S. Thiebaud, H. Guermoud).

5.2—Online Range Expansion from Selected Planar Key Views

The determination of the range expansion representation 27 from elementary range expansion representations 26 is developed below in particular examples, particularly suited to online processing.

In a horizontal-only implementation, a static VR scene covering 360 degrees horizontally (Le, a cylinder) is provided with a set V of n predefined planar key views $v_i$ having respective predefined range expansion profiles $p_i$ (La sets of parameter values), where $i \in \{1, \ldots, n\}$. In addition, a VR device is adapted to determine a view u that a user is currently looking at.

Figure 8:
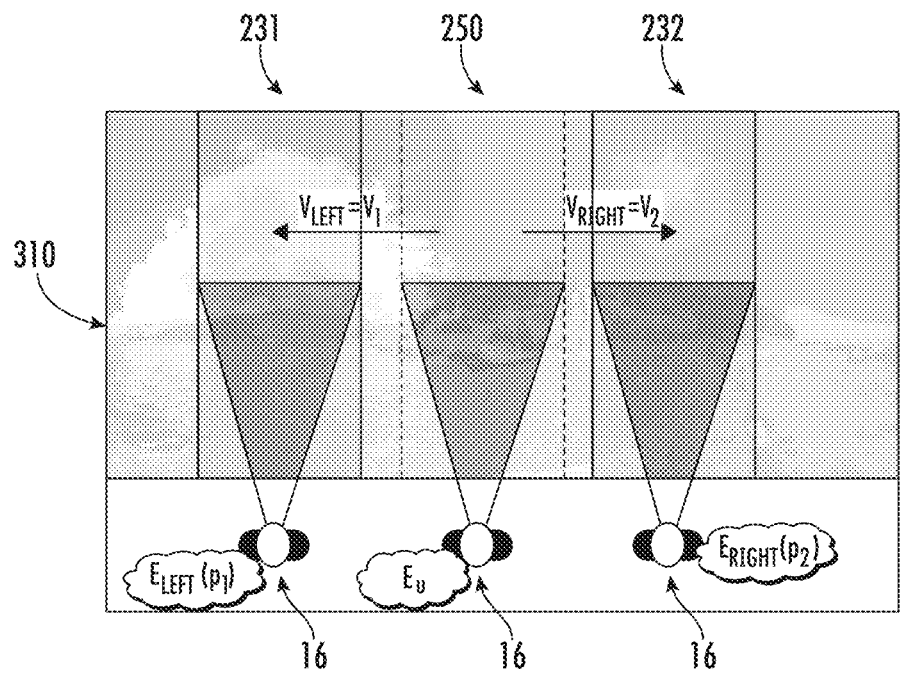
FIG. 8 shows the determination of ITM results for three user views, depending on the positioning of those user views with respect to two successive planar key views, in ITM embodiments of the device of FIG. 1.

The module 12 of the device 1 is adapted to first check whether the current user viewpoint corresponds exactly to any of the key views $v_i$. This is illustrated on FIG. 8, where several viewpoints by a user 16 are shown on an equirectangular projection 310 of the VR scene, and positioned with respect to two neighboring planar key views 231 ($v_1$) and 232 ($v_2$) that belong to the set V of the predefined planar key views V, and respectively associated with profiles $p_1$ and $p_2$.

If the view u coincides with one of the key views $v_i$, the module 14 is adapted to apply the associated profile $p_i$ to compute the range expansion representation 27 (corresponding here to an expansion map), from an LDR content over the key view $v_i$. The HDR content 22 over the viewpoint u identical to the key view $v_i$ can then be derived therefrom. For example, if the user 16 is centered on one of the key views 231 or 232, the respectively associated profile $p_i$ or $p_2$ is applied, leading to a range expansion representation $E_{0,left}$ for key view 231 or $E_{0,right}$ for key view 232.

Otherwise, if the user viewpoint does not correspond exactly to any of the key views $v_i$, a nearest key view is detected going clockwise and a nearest key view is likewise detected going anti-clockwise. For example, if the user 16 has an intermediate view 250 ($u$), the key views 231 and 232 are selected respectively as a closest left view ($v_{left}=v_1$) and a closest right view ($v_{right}=v_2$). Those are exploited in obtaining a range expansion representation E available for deriving the HDR content over user view u.

In this respect, a distance $d_2$ between the user view u and the right view $v_{right}$ is obtained by the difference in degrees between the center of the user view u and the center of the right view $v_{right}$. Also, a distance $d_{1,2}$ is given by the difference in degrees between the centers of the left view $v_{left}$ and right view $v_{right}$. This provides an interpolation weight α (comprised between 0 and 1) given by:

$$\alpha = d_2/d_{1,2} \qquad (5)$$

Now, two elementary range expansion representations $E_{u,left}$ and $E_{u,right}$ are computed from an LDR content over user view u, using respectively the parameter values $p_1$ and $p_2$ associated with the left key view $v_{left}$ and the right key view $v_{right}$. It deserves noting that those elementary range expansion representations correspond to two different ways of expanding a same view, and as such apply to the same input pixels.

Those elementary range expansion representations are then interpolated for deriving the resulting range expansion representation $E_u$ (here a resulting expansion map):

$$E_u = (1-\alpha)E_{u,right} + \alpha E_{u,left} \qquad (6)$$

That range expansion representation E can then be used for obtaining the HDR content over user view u.

In more general implementations, the VR scene is spherical and covers 360 degrees both horizontally and vertically. Not only the horizontal direction but also the vertical direction are then taken into account.

The device 1 is then configured to proceed as follows:
given the user view u, checking whether it corresponds exactly to any particular key view $v_i$,
if yes, selecting and applying to the LDR content 21 associated with the use; view u the corresponding profile $p_i$ in deriving the range expansion representation $E_u$;
if no (the user view u does not correspond exactly to any of the key views $v_i$):
  detecting a nearest key view $v_{right}$ going clockwise, a nearest key view $v_{left}$ going anti-clockwise, a nearest key view $v_{up}$ moving upwards and a nearest key view $v_{down}$ moving downwards;
  computing the elementary range expansion representations $E_{right}$, $E_{left}$, $E_{up}$ and $E_{down}$ over user view u by applying respectively profiles $p_{right}$, $p_{left}$, $p_{up}$ and $p_{down}$ associated with the key views $v_{right}$, $v_{left}$, $v_{up}$ and $v_{down}$;
  calculating the final range expansion representation $E_u$ by a scattered (irregular grid) interpolation giving interpolation weights between the four elementary range expansion representations, those weights depending on the distance of the user view u to the four adjacent key views $v_{right}$, $v_{left}$, $v_{up}$ and $v_{down}$; related methods are described for example in the article "Scattered Data Interpolation for Computer Graphics" by K. Anjyo, J. P. Lewis and F. Pighin, *SIGGRAPH* 2014 *Course Notes, ACM SIGGRAPH;* obtaining the HDR content 22 from the LDR content 21 by using the range expansion representation $E_u$.

Specific embodiments of the device 1 are particularly suited to a VR scene having temporally varying contents. In such cases, further to an observer being able to rotate within the VR scene (that may be static) so as to observe different parts of it, the VR scene is also changing in time.

In a particular embodiment of that kind, the determination of the planar key views 23 relies on analyzing upstream the VR scene content and splitting it into a plurality of shots. A shot is defined as a short sequence of video content (i.e. VR scene content) where not many variations occur. From each shot, a single representative frame known as a "key frame" is then extracted. This can be carried out for example using one of the methods described in the article "Key Frame Extraction from Videos—A Survey" by A. Nasreen and G. Shobha, *International Journal of Computer Science & Communication Networks*, 2013.

For each of the thereby obtained key frames $f_j$, a number of key views $n_j$ are then automatically or manually extracted, in a similar way as previously described in static situations. For all other frames within a shot, the key views 23 are considered as being at the same locations as for the corresponding key frame, and the same parameter values 24 are applied accordingly.

5.3—Offline Range, Expansion from Selected Planar Key Views.

In alternative execution modes, which can be available in the device 1 instead of, as well as in combination with, the previous modes relevant to online range expansion, the VR scene content is processed prior to viewing. Those modes are particularly suited to offline processing applications, where the viewpoint of the user is not known.

In advantageous related embodiments, the device 1 is adapted to determine interpolated parameter values and therefore an expansion value for each pixel i in a VR scene representation, such as notably an equirectangular projection image. The leads to a single expansion map $E_a r$ that covers the complete VR scene (through the equirectangular image) rather than independent views.

In this respect, the device 1 is advantageously configured for executing the following steps in particular implementations, the considered curved shape VR scene being associated with an equirectangular projection image:

for each pixel i in the equirectangular image, a corresponding point is computed on the VR scene (such as a sphere) following an inverse equirectangular projection;

nearby key views are detected among the available key views 23 for each of the pixels i, leading to the selected key views 230 and their associated parameter values 240; the latter amounts to range expansion profiles $p_{right}$, $p_{left}$, $p_{up}$ and $p_{down}$ such as advantageously those respectively associated with the four closest key views $v_{right}$, $v_{left}$, $v_{up}$ and $v_{down}$ in the horizontal and vertical directions;

using each of those profiles, respective expansion values $E_{right}(i)$, $E_{left}(i)$, $E_{up}(i)$ and $E_{down}(i)$ are computed, evaluated only for pixel i the expansion values $E_{right}(i)$, $E_{left}(i)$, $E_{up}(i)$ and $E_{down}(i)$ are combined for pixel i, using any interpolation method appropriate for scattered data as previously described, giving a resulting expansion value $E_{er}(i)$;

repeating the above process (in parallel and/or successively) for all pixels i of the equirectangular image, so as to obtain the range expansion representation 27 comprising the expansion values $E_{er}$;

expanding the LDR content 21 of the equirectangular image to the HDR content 22 by using the range expansion representation 27.

Though in those implementations, each pixel requires four different calculations of expansion values using four different range expansion profiles that correspond to nearby key views, as well as an interpolation to obtain the final expansion value for that pixel, it can be anyway efficient in various cases. Indeed, once that upstream processing is done, a spatially varying HDR content is available for the whole VR scene, without requiring the user to ever create marks or to otherwise manually guide which settings are applied where on the scene.

5.4—ITM Applications

Some ITM applications, in which the dynamic range expansion pertains to luminance, are described below. In those applications, the parameter values 24 correspond to ITM profiles.

Luminance values of pixels of a VR scene content can be directly available when the content is encoded in a color opponent space, such as YUV. Otherwise, the luminance values may be obtained through appropriate calculation based on the components of the color space.

The transformation of the LDR content 21 to the HDR content 22, and/or the determination of the range expansion representations 26 and 27, rely advantageously on an LDR luminance content analysis over the whole or a portion of the VR scene.

In particular implementations involving computations over user views, the luminance content is analyzed over the currently processed user view. In other implementations involving computations pixel by pixel, the luminance content is analyzed over a window of the VR scene content, centered at the current pixel (the window size being e.g. 5 or 7). In still other implementations, the luminance content is analyzed over the whole VR scene, whether for user views or for pixels.

In advantageous embodiments, the exploited intermediary range expansion representation 27 and the elementary range expansion representations 26 consist in exponent expansion maps E as detailed in any implementation of the patent applications WO 2015/096955 (inventors T. Pouli, E. Reinhard and C. Chamaret) and WO 2017/032822 (inventors T. Pouli, L. Cauvin and J. Kervec), both at the name of the present Applicant.

In this respect, an LDR image luminance Y is expanded using a per-pixel exponential function given by the exponent expansion map E(i) in order to obtain an expanded HDR luminance $Y_{exp}$ for any pixel i:

$$Y_{exp}(i)=Y(i)^{E(i)} \times Y_{enhance}^{c}(i) \qquad (7)$$

where $Y_{enhance}$ is a high-pass filtered version of Y encoding details of the image and c is a detail enhancement parameter that can be user-controlled. In addition, in some implementations, the expansion map E is calculated based on a parameter $L_{max}$, which loosely relates to a maximum peak luminance of a target display.

Luminance information of colors in the image content can be generally processed, for example, with the aim of recovering or recreating the appearance of the original scene. For example, such ITMs can take a conventional (i.e. LDR) image as input, expand the luminance range of the colors of the image in a global manner, and subsequently process highlights or bright regions locally to enhance the HDR appearance of colors in the image.

However, better results may be obtained if the expansion of luminance range is adjusted to better suit different luminance zones. In particularly attractive embodiments, as detailed in above-cited WO 2017/032822, ITM based on luminance zones is used to expand the dynamic range of content, while allowing for independent adjustment of the expansion in different zones of luminance.

For example, a low zone (e.g., a shadow zone), a middle zone (e.g., a midtone zone), and a high zone (e.g., a highlight zone) are defined, while the amount of luminance expansion in each of the three zones can be independently adjusted. In this way, for example, the expansion of the dynamic range of an image can be adjusted to account for how different luminance zones of the image respond to the expansion. In various embodiments, the luminance zone boundaries can be automatically selected based on an analysis of the image. In other various embodiments, the luminance zone boundaries can be user-selected.

In other examples, two different luminance zones are defined, which include a shadow luminance zone and a highlight luminance zone.

Figure 9:
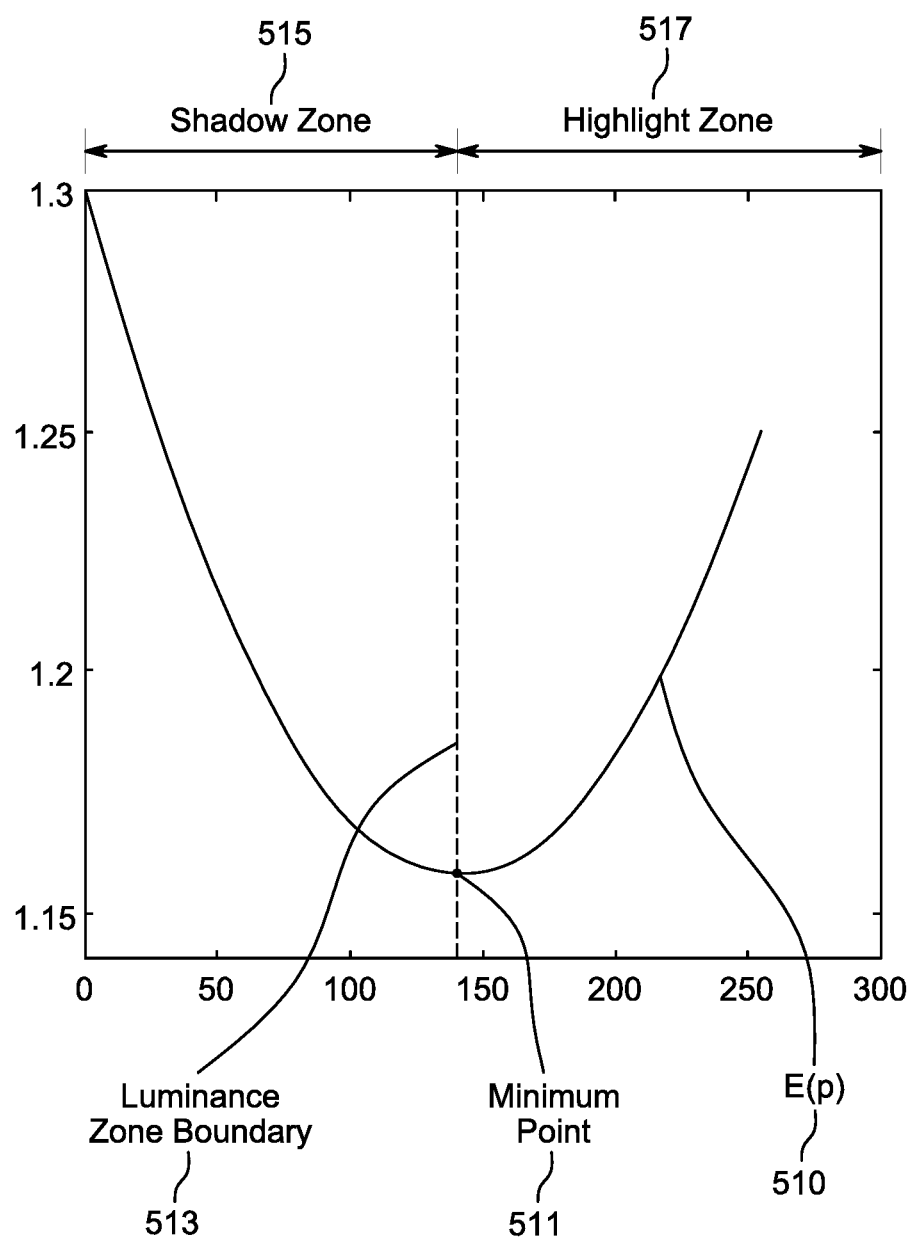
FIG. 9 illustrates an example of a curve E(p) and shows a minimum point of E(p) that can be used to define a luminance boundary zone, in ITM embodiments of the device of FIG. 1.

For example, and as developed in WO 2017/032822, the expansion exponent map is given by quadratic functions over each luminance zone, in function of a low-pass filtered version of luminance noted $Y_{base}$ (see formula (1) in WO 2017/032822 regarding the determination of $Y_{base}$):

$$E(p)=a(Y_{base})^2+bY_{base}+c \qquad (8)$$

where the coefficients a, b and c are based on the maximum display luminance $L_{max}$ and also depend on specific adjustment parameters (see e.g. formulas (3)-(5) in WO 2017/032822). Exploiting different luminance zones enables to select distinct values of those adjustment parameters in function of the concerned luminance zone. For sake of illustration, as represented on FIG. 9, a curve 510 of the exponent expansion map E(p) (where p designates a pixel) is obtained from a homogeneous set of coefficients a, b, c. It shows a minimum point 511 that can be used to define a luminance boundary zone 513 dividing luminance into two luminance zones, i.e. a shadow luminance zone 515 and a highlight luminance zone 517. On this ground, the left half and right half of the curve E(p) can be adjusted independently while maintaining continuity of the curve at the luminance zone boundary.

Adjusting the left and right halves can allow for independent adjustment of the expansion in shadows and highlights, respectively, while shifting the entire curve E(p) up or down can be used to adjust the expansion with a focus on midtones.

All or some of the related parameters, which provide e.g. the coefficients of the quadratic representations of E(p), are advantageously exploited as the parameter values 24.

Figure 10:
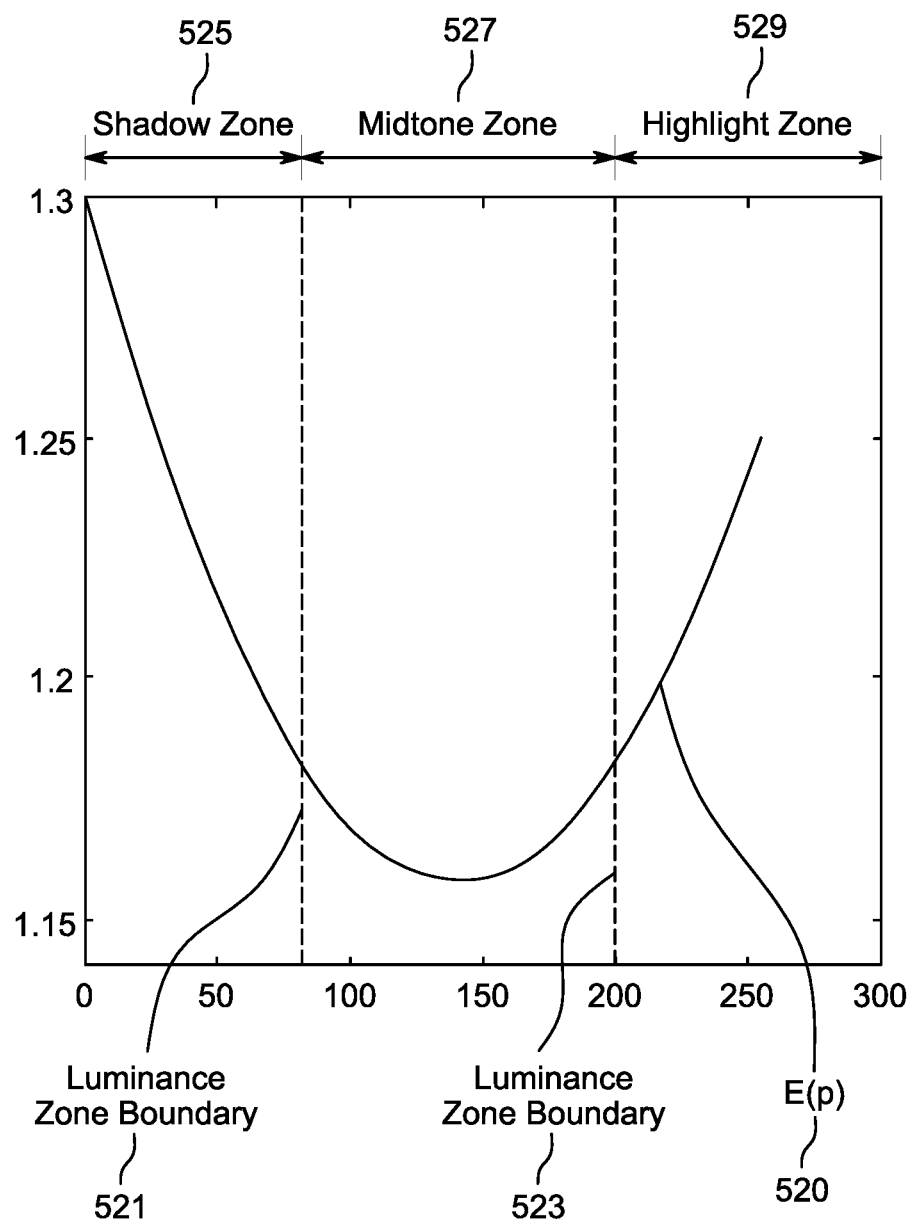
FIG. 10 illustrates an example of a zone expansion exponent map with a first luminance zone boundary based on a shadow cutoff parameter and a second luminance zone boundary based on a highlight cutoff parameter, in ITM embodiments of the device of FIG. 1.

In another example, represented on FIG. 10, a curve 520 of the zone expansion map E(p) is obtained from a homogeneous set of coefficients a, b, c. With reference to the description in WO 2017/032822 about FIG. 7, a first luminance zone boundary 521 is based on a shadow cutoff parameter and a second luminance zone boundary 523 is based on a highlight cutoff parameter. The luminance zone boundaries divide the luminance into a shadow zone 525, a midtone zone 527 and a highlight zone 529. From this partition, each of the three luminance zones can be associated with distinct adjustment parameters (see formulas (10) to (21) in WO 2017/032822).

All or some of the related parameters, which provide e.g. the coefficients of the quadratic representations of E(p), are advantageously exploited as the parameter values 24.

In this respect, the parameter values 24 are advantageously given by at least one of the following parameters:
highlight parameter (e.g. comprised between 0.1 and 3),
midtone parameter (e.g. comprised between 0.9 and 1.1),
shadow parameter (e.g. comprised between −3 and 3),
cutoff parameters (e.g. comprised between 0 and 1).

When some of those parameters are not exploited for the parameter values 24, they are advantageously set to a default value, e.g. 1 in the above examples.

Figure 11:
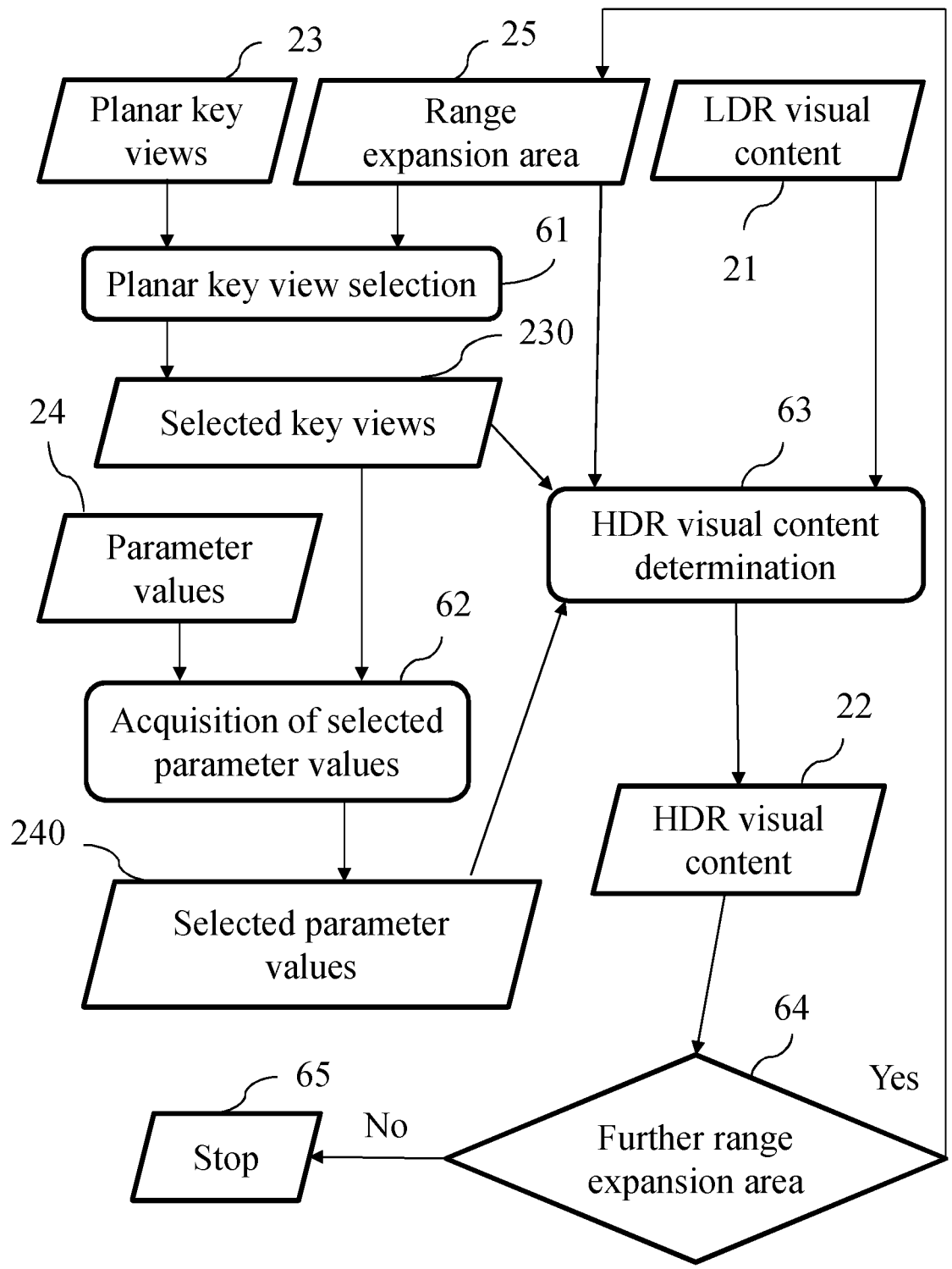
FIG. 11 is a flow chart showing successive steps executed with the device of FIG. 1.

In execution, as illustrated on FIG. 11, the device 1 can proceed as follows in expanding the range of the VR scene content. The range expansion area 25 is used at step 61 for selecting among the planar key views 23 the selected planar key views 230, from which at step 62 the associated parameter values 240 are obtained among the parameter values 24. Based on the range expansion area 25, the selected planar key views 230 and the associated parameter values 240, the current LDR visual content 21 is transformed to the current HDR visual content 22 at step 63. As mentioned above, the range expansion can possibly be carried out in part or all of one or more of the selected planar key views 230. The current HDR content 22 provides the desired output, and can be possibly completed over time.

It is then checked whether further range expansion area must be processed at step 64, e.g. in case the processing takes place pixel by pixel or at least two user viewpoints must be processed. It should be noted that the pixel processing advantageously takes place at least partly in parallel rather than fully in series, notably in parallel computers or in Graphics Processing Units (GPUs). If further range expansion area must be processed, the steps above are executed again. Otherwise, (step 65), the process is ended.

Figure 12:
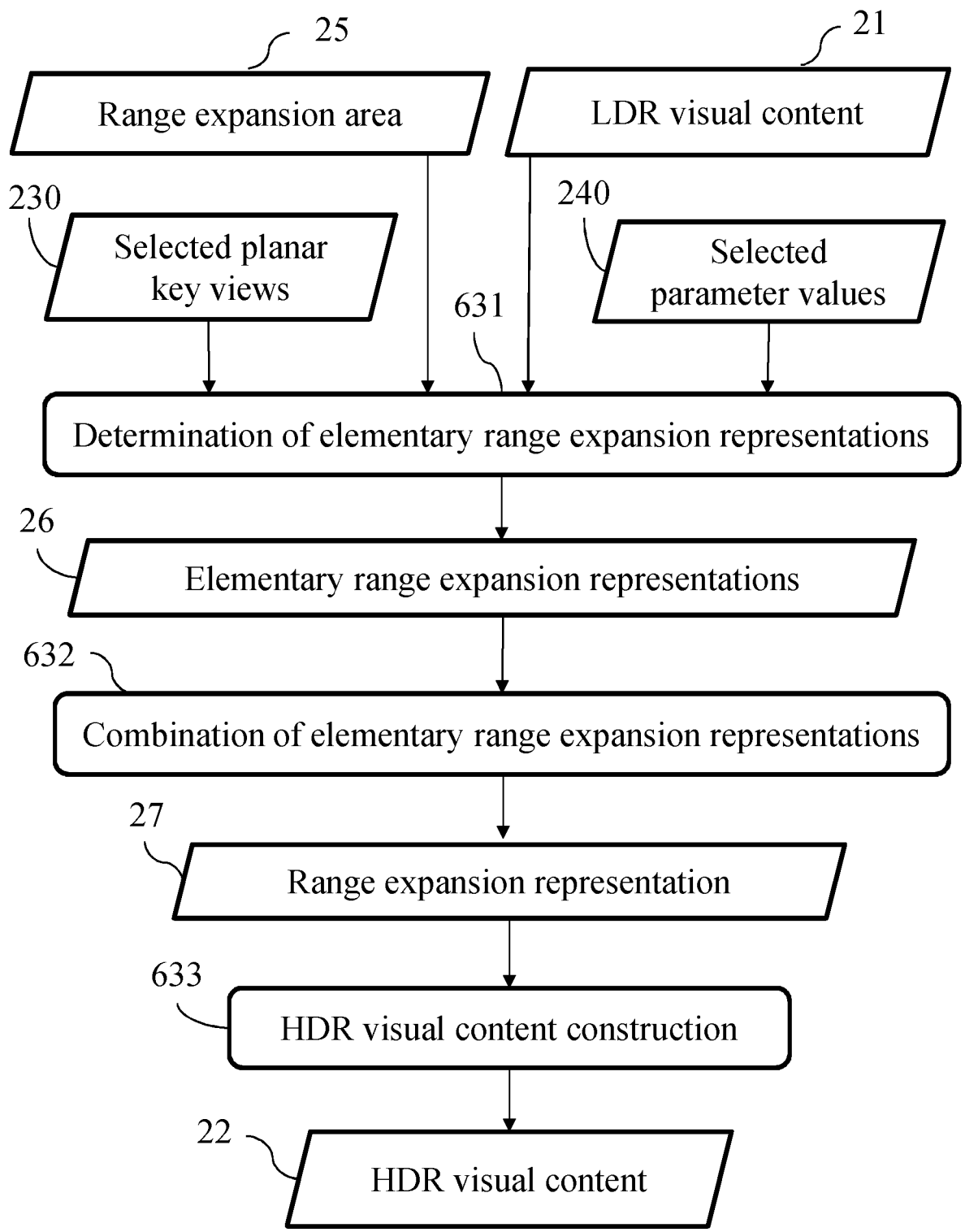
FIG. 12 is a flow chart detailing a step of determination of a high dynamic range content in the flow chart of FIG. 11.

More precisely regarding the step 63 of HDR content determination, as shown on FIG. 12, the elementary range expansion representations 26 are first determined at step 631 from the selected planar key views 230 and associated parameters 240, based on the range expansion area 25 and the LDR content 21. They are combined at step 632 into the range expansion representation 27, which is exploited at step 633 for constructing the HDR content 22.

A particular apparatus 7, visible on FIG. 13, is embodying the device 1 described above. It corresponds for example to a tablet, a smartphone, a head-mounted display (HMD), or a games console—such as a specialized games console producing and displaying images live. In alternative embodiments, it corresponds to a server or a gateway.

Advantageously, the apparatus 7 is adapted to 360° immersive display, such as notably an HMD or a centralized picoprojector set. In alternative implementations, the apparatus 7 has instead a limited FoV (e.g. a tablet) while being adapted to visualize pieces of a full 360° scene when rotated around a user.

That apparatus 7 is suited to virtual reality. In some implementations, it is alternatively or also relevant to augmented reality (AR), whether for direct view (the user is typically viewing the real 3D scene through a glass), indirect view (the user is viewing the real 3D scene displayed on a screen), or both. AR applications refer to a live view of a real-world environment whose elements are augmented by computer-generated (CG) content, such as video or graphics. In the present disclosure, AR further encompasses Mixed Reality (MR), in which the CS content further interacts with the real-world environment, and digital and physical realities seamlessly blend together. In some AR embodiments of the apparatus 7, portions of the VR scene or of a current user view are mixed with live views of the real-world environment.

The apparatus 7 comprises the following elements, connected to each other by a bus 75 of addresses and data that also transports a clock signal:
- a microprocessor 71 (or CPU);
- a graphics card 72 comprising several Graphical Processor Units (or GPUs) 720 and a Graphical Random Access Memory (GRAM) 721;
- a non-volatile memory of ROM type 76;
- a RAM 77;
- one or several I/O (Input/Output) devices 74 such as for example a keyboard, a mouse, a joystick, a webcam; other modes for introduction of commands such as for example vocal recognition are also possible;
- a power source 78; and
- a radiofrequency unit 79.

The apparatus 7 also comprises a display device 73 of display screen type directly connected to the graphics card 72 to display synthesized images calculated and composed in the graphics card, for example live. The use of a dedicated bus to connect the display device 73 to the graphics card 72 offers the advantage of having much greater data transmission bitrates and thus reducing the latency time for the displaying of images composed by the graphics card. According to a variant, a display device is external to apparatus 7 and is connected thereto by a cable or wirelessly for transmitting the display signals. The apparatus 7, for example through the graphics card 72, comprises an interface for transmission or connection adapted to transmit a display signal to an external display means such as for example an LCD or plasma screen or a video-projector. In this respect, the RF unit 79 can be used for wireless transmissions.

In an alternative implementation, the display device 73 corresponds to a glass through which the user is seeing the real environment, and the apparatus 7 further comprises an optical projection system (not represented), which enables to project e.g. generated virtual images or contents on the glass.

It is noted that the word "register" used in the description of memories 721 and 77 can designate in each of the memories mentioned, a memory zone of low capacity (some binary data) as well as a memory zone of lame capacity (enabling a whole program to be stored or all or part of the data representative of data calculated or to be displayed). Also, the registers represented for GRAM 721 can be arranged and constituted in any manner, and each of them does not necessarily correspond to adjacent memory locations and can be distributed otherwise (which covers notably the situation in which one register includes several smaller registers).

When switched-on, the microprocessor 71 loads and executes the instructions of the program contained in the RAM 77.

The random access memory 77 comprises notably:
- in a register 770, the operating program of the microprocessor 71;
- in a register 771, information representative of the LDR content 21 of the VR scene (for example models of the object(s) of the scene and lighting parameters);
- in a register 772, information representative of the planar key views 23;
- in a register 773, the parameter values 24 associated with the planar key views 23;
- in a register 774, parameters representative of user views;
- in a register 775, parameters representative of the range expansion area 25.

The algorithms implementing the steps of the method specific to the present disclosure and described above are stored in the memory GRAM 721 of the graphics card 72 associated with the apparatus 7 implementing those steps. When switched on and once the parameters 771, 772, 773 and 775, and possibly 774 (in case of focus on user view) are loaded into the RAM 77, and the selected key views 230 and associated parameter values 240 are derived from the range expansion area 25. The graphic processors 720 of graphics card 72 load the appropriate information and parameters into the GRAM 721 and execute the instructions of algorithms in the form of microprograms of "shade" type using HLSL (High Level Shader Language) language or GLSL (OpenGL Shading Language) for example. Those algorithms include the dynamic range expansion for the VR scene or user views.

The random access memory GRAM 721 comprises notably:
- in a register 7211, information representative of the LDR content 21 of the VR scene;
- in a register 7212, parameters representative of the selected planar key views 230;
- in a register 7213, the parameter values 240 associated with the selected planar key views 230;
- in a register 7214, parameters representative of user views;
- in a register 7215, parameters representative of the range expansion area 25;
- in a register 7216, information representative of the HDR content 22 of the VR scene.

In the above embodiment, the dynamic range expansion is prepared in the RAM 77 and effected and rendered in the GPUs 720. In variant implementations, tasks are distributed differently, the HDR expansion being e.g. executed by the CPU 71, or conversely the selected key views 230 and associated parameter values 240 being determined by the GPUs 720.

As will be understood by a skilled person, the presence of the graphics card 72 is not mandatory, and can be replaced with simpler visualization implementations.

According to another variant, the power supply 78 is external to the apparatus 7.

On the ground of the present disclosure and of the detailed embodiments, other implementations are possible and within the reach of a person skilled in the art without departing from the scope of the invention. Specified elements can notably be interchanged or associated in any manner remaining within the frame of the present disclosure. Also, elements of different implementations may be combined, supplemented, modified, or removed to produce other implementations. All those possibilities are contemplated by the present disclosure.

The invention claimed is:

1. A device for adapting at least an area of a lower dynamic range visual content of a virtual reality scene to a higher dynamic range display of said area, wherein said device comprises at least one processor configured for:
   determining a range expansion representation in said area based on at least two elementary range expansion representations in said area, said elementary range expansion representations being associated with respectively at least two planar key views selected among a set of planar key views associated with said virtual reality scene and being based on parameter values associated with the two planar key views, said elementary range expansion representations being combined by weighting said elementary range expansion representations with respective weights decreasing with distances from at least part of said area to said associated planar key views; and expanding dynamic range of said area by determining said higher dynamic range visual content from said range expansion representation;

wherein at least one of said parameter values associated with at least one of said planar key views depends on the lower dynamic range visual content in said at least one of said planar key views and said parameter values are adapted to expand a dynamic range of a visual content.

2. The device according to claim 1, wherein at least one of said parameter values associated with at least one of said planar key views depends on the lower dynamic range visual content in said at least one of said planar key views.

3. The device according to claim 1, wherein determining said higher dynamic range visual content includes raising a luminance of said lower dynamic range visual content at a power given by said range expansion representation.

4. The device according to claim 1, wherein said area is located within at least one current view available to a user in said virtual reality scene.

5. The device according to claim 1, wherein a union of said planar key views and of said area covers entirely said virtual reality scene.

6. The device according to claim 1, wherein said area comprises at least part of said planar key views.

7. The device according to claim 1, wherein said at least one processor is further configured for:
selecting as said planar key views among a set of potential planar key views, at least two of the potential planar key views being closest to at least a portion of said area.

8. The device according to claim 7, wherein said area comprises pixels, said at least a portion of said area corresponds to any of said pixels.

9. The device according to claim 1, wherein said virtual reality scene being temporally varying as a video content, said at least one processor is further configured for:
extracting at least two shots from said video content,
extracting one single representative frame from each of said shots, and
in each of said representative frames, obtaining said planar key views and said associated parameter values, and determining said higher dynamic range visual content from said planar key views and associated parameter values,
in other frames than said representative frames in any of said shots, determining said higher dynamic range visual content based on positions of the planar key views and on the associated parameter values as obtained for the representative frame of said shot.

10. The device according to claim 1, wherein said at least one parameter is selected among parameters controlling a range expansion in a lower luminance zone, a range expansion in a higher luminance zone, a range expansion in a middle luminance zone, and parameters defining thresholds between luminance zones.

11. A method for adapting at least an area of a lower dynamic range visual content of a virtual reality scene, to a higher dynamic range display of said area, wherein said method comprises:
determining a range expansion representation in said area based on at least two elementary range expansion representations in said area, said elementary range expansion representations being associated with respectively at least two planar key views selected among a set of planar key views associated with said virtual reality scene and being based on parameter values associated with the two planar key views, said elementary range expansion representations being combined by weighting said elementary range expansion representations with respective weights decreasing with distances from at least part of said area to said associated planar key views; and expanding dynamic range of said area by determining said higher dynamic range visual content from said range expansion representation, wherein at least one of said parameter values associated with at least one of said planar key views depends on the lower dynamic range visual content in said at least one of said planar key views and said parameter values are adapted to expand a dynamic range of a visual content.

12. The method according to claim 11, wherein determining said higher dynamic range visual content includes raising a luminance of said lower dynamic range visual content at a power given by said range expansion representation.

13. The method according to claim 11, further comprising:
selecting as said planar key views among a set of potential planar key views, at least two of the potential planar key views being closest to at least a portion of said area.

14. The method according to claim 11, wherein said virtual reality scene being temporally varying as a video content, further comprising:
extracting at least two shots from said video content,
extracting one single representative frame from each of said shots, and
in each of said representative frames, obtaining said planar key views and said associated parameter values, and determining said higher dynamic range visual content from said planar key views and associated parameter values,
in other frames than said representative frames in any of said shots, determining said higher dynamic range visual content based on positions of the planar key views and on the associated parameter values as obtained for the representative frame of said shot.

15. The method according to claim 11, wherein said at least one parameter is selected among parameters controlling a range expansion in a lower luminance zone, a range expansion in a higher luminance zone, a range expansion in a middle luminance zone, and parameters defining thresholds between luminance zones.

16. A non-transitory machine readable medium having stored thereon machine executable instructions that, when executed on a processor, adapt at least an area of a lower dynamic range visual content of a virtual reality scene to a higher dynamic range display of said area, the instructions causing the processor to:
determine a range expansion representation in said area based on at least two elementary range expansion representations in said area, said elementary range expansion representations being associated with respectively at least two planar key views selected among a set of planar key views associated with said virtual reality scene and being based on parameter values associated with the two planar key views, said elementary range expansion representations being combined by weighting them with respective weights decreasing with distances from at least part of said area to said associated planar key views, and expand dynamic range of said area by determining said higher dynamic range visual content from said range expansion representation, wherein at least one of said parameter values associated with at least one of said planar key views depends on the lower dynamic range visual content in said at least one of said planar key views and said parameter values are adapted to expand a dynamic range of a visual content.

17. The method according to claim 11, wherein at least one of said parameter values associated with at least one of said planar key views depends on the lower dynamic range visual content in said at least one of said planar key views.

18. The method according to claim 11, wherein said area is located within at least one current view available to a user in said virtual reality scene.

19. The method according to claim 11, wherein a union of said planar key views and of said area covers entirely said virtual reality scene.

20. The method according to claim 11, wherein said area comprises at least part of said planar key views.

\* \* \* \* \*